UNITED STATES PATENT OFFICE.

JOHN B. N. BERRY, OF WASHINGTON, DISTRICT OF COLUMBIA.

PROCESS OF MAKING PLASTER OR MORTAR.

No. 800,606.           Specification of Letters Patent.           Patented Sept. 26, 1905.

Application filed April 6, 1904. Renewed August 30, 1905. Serial No. 276,475.

*To all whom it may concern:*

Be it known that I, JOHN B. N. BERRY, a citizen of the United States, residing at Washington, in the District of Columbia, have invented certain new and useful Improvements in Processes of Making Plaster or Mortar, of which the following is a description.

My invention relates to a process of making plaster or mortar for such uses as plaster or mortar are applied to and to the plaster or mortar produced by the process.

It is the object of my invention to utilize for the production of a strong, durable, and satisfactory plaster or mortar refuse or waste material readily obtained in all large cities.

The material which forms the basis of my composition is the spent lime from gas-purifiers. This when taken from the purifiers is sulfureted lime and is practically without value as compared with any other basis for plaster or mortar. After exposure to the weather for some time the sulfur combines with the lime to form a sulfate of lime or gypsum. This sulfate of lime I mix with clay rich in aluminium in about the proportion of three parts of the sulfate of lime to one part of clay and grind the mixture to a fine powder. This powder is then mixed with sufficient water to make it plastic and is pugged or formed into balls or blocks, which after being thoroughly dried are calcined at a heat of about 275° Fahrenheit—that is, at a heat sufficient to calcine the mass, but not sufficient to destroy the setting qualities of the sulfate of lime or gypsum. To each one hundred pounds of the calcined mass I add sand or quartz rock and thoroughly-slaked lime, preferably air-slaked, and clay in the proportions of about one hundred and seventy pounds of sand or quartz rock, twenty pounds of lime, and ten pounds of clay, though these proportions may be varied somewhat, depending upon the use to which the plastic or mortar is to be put. The mixture thus made is ground to a sufficiently fine powder, preferably to a powder which will pass through an eighty-mesh sieve. The product is then ready for use when mixed with sufficient water to form a plastic mass suitable for application to walls as a plaster or for use for brick or masonry work. The mixture may also be combined with magnesium or asbestos for use as a fireproofing material for walls and partitions.

I do not desire to be limited to any particular proportions of the several substances used, as these may be varied within wide limits, the essential feature of my invention being the use as a basis for plaster or mortar of the spent lime from gas-purifiers mixed with clay rich in aluminium and calcined at a heat of about 275°.

The plaster made according to my process indurates thoroughly, has great adhesiveness, sets in about twenty-four hours, does not disintegrate with age or from dampness, and takes a smooth finish without the addition of plaster-of-paris.

Having thus described my invention, what I claim as new, and desire to secure by Letters Patent, is—

1. The herein-described process of utilizing the spent lime from gas-purifiers to form plaster or mortar, which consists in mixing the spent lime with clay rich in aluminium to form an intimate mixture, and calcining the mixture at a heat less than the heat necessary to destroy the setting qualities of the sulfate of lime present in the spent lime.

2. The herein-described process of utilizing the spent lime from gas-purifiers to form plaster or mortar, which consists in mixing the spent lime with clay rich in aluminium to form an intimate mixture, and calcining the mixture at a heat less than the heat necessary to destroy the setting qualities of the sulfate of lime present in the spent lime and adding slaked lime and clay to the calcined mixture.

3. The herein-described process of utilizing the spent lime from gas-purifiers to form plaster or mortar, which consists in mixing such spent lime in which the sulfur taken up by the lime has combined therewith to form sulfate of lime with clay rich in aluminium, to form an intimate mixture, and calcining the mixture at a heat below that which would destroy the setting qualities of the sulfate of lime.

4. The herein-described process of utilizing the spent lime from gas-purifiers for making plaster or mortar, which consists in mixing the spent lime with clay rich in aluminium, reducing the mixture to powder and calcining it at a heat less than the heat necessary to destroy the setting qualities of the sulfate of lime present in the spent lime.

5. The herein-described process of utilizing the spent lime from gas-purifiers for making plaster or mortar, which consists in mixing the spent lime with clay rich in aluminium, reducing the mixture to powder, mixing the powder with water, forming it into balls or blocks, calcining at a heat less than the heat necessary to destroy the setting qualities of the sulfate of lime present in the spent lime and pulverizing the calcined mixture.

6. The herein-described process of utilizing the spent lime from gas-purifiers for making plaster or mortar, which consists in mixing the spent lime with clay rich in aluminium, reducing the mixture to powder, mixing the powder with water, forming it into balls or blocks, calcining at a heat less than the heat necessary to destroy the setting qualities of the sulfate of lime present in the spent lime, pulverizing the calcined mixture, adding slaked lime, clay and sand to the powder thus formed and finely pulverizing the mixture.

7. The herein-described powder for use as a plaster or mortar, having as its basis spent lime from gas-purifiers having the compound of sulfur and lime originally present therein converted into sulfate of lime by exposure to weather, combined with clay rich in aluminium and calcined at a heat less than the heat necessary to destroy the setting qualities of the sulfate of lime.

In testimony whereof I affix my signature in presence of two witnesses.

JOHN B. N. BERRY.

Witnesses:
E. H. Parkins,
Albert Popkins.